United States Patent
Porcelli et al.

(10) Patent No.: US 11,186,671 B2
(45) Date of Patent: Nov. 30, 2021

(54) REDUCED FLAMMABILITY FLEXIBLE POLYURETHANE FOAM

(71) Applicant: Dow Global Technologies LLC, Midland, MI (US)

(72) Inventors: Lucie Porcelli, Horgen (CH); Francois M. Casati, Horgen (CH); Paul Cookson, Horgen (CH)

(73) Assignee: Dow Global Technologies LLC, Midland, MI (US)

(*) Notice: Subject to any disclaimer, the term of this patent is extended or adjusted under 35 U.S.C. 154(b) by 384 days.

(21) Appl. No.: 16/337,471

(22) PCT Filed: Sep. 25, 2017

(86) PCT No.: PCT/US2017/053167
§ 371 (c)(1),
(2) Date: Mar. 28, 2019

(87) PCT Pub. No.: WO2018/063959
PCT Pub. Date: Apr. 5, 2018

(65) Prior Publication Data
US 2019/0284330 A1 Sep. 19, 2019

Related U.S. Application Data

(60) Provisional application No. 62/401,584, filed on Sep. 29, 2016.

(51) Int. Cl.
| C08G 18/48 | (2006.01) |
| C08G 18/16 | (2006.01) |
| C08G 18/18 | (2006.01) |
| C08G 18/22 | (2006.01) |
| C08G 18/24 | (2006.01) |
| C08G 18/40 | (2006.01) |
| C08G 18/76 | (2006.01) |
| C08K 5/3492 | (2006.01) |
| C08K 5/54 | (2006.01) |
| C08G 18/66 | (2006.01) |

(52) U.S. Cl.
CPC ......... *C08G 18/485* (2013.01); *C08G 18/163* (2013.01); *C08G 18/168* (2013.01); *C08G 18/18* (2013.01); *C08G 18/1833* (2013.01); *C08G 18/222* (2013.01); *C08G 18/244* (2013.01); *C08G 18/409* (2013.01); *C08G 18/4816* (2013.01); *C08G 18/4829* (2013.01); *C08G 18/4833* (2013.01); *C08G 18/4841* (2013.01); *C08G 18/6688* (2013.01); *C08G 18/7621* (2013.01); *C08K 5/34922* (2013.01); *C08K 5/54* (2013.01); *C08G 2110/005* (2021.01); *C08G 2110/0008* (2021.01); *C08G 2110/0083* (2021.01)

(58) Field of Classification Search
CPC .... C08G 18/163; C08G 18/168; C08G 18/18; C08G 18/1833; C08G 18/222; C08G 18/244; C08G 18/409; C08G 18/4816; C08G 18/4829; C08G 18/4833; C08G 18/4841; C08G 18/485; C08G 18/6688; C08G 18/7621; C08G 2110/0008; C08G 2110/005; C08G 2110/0083; C08K 5/34922; C08K 5/54
See application file for complete search history.

(56) References Cited

U.S. PATENT DOCUMENTS

| 5,179,131 A * | 1/1993 | Wujcik ............... C08G 18/281 521/130 |
| 2006/0058410 A1 | 3/2006 | Yu et al. |
| 2008/0096993 A1 | 4/2008 | Casati et al. |
| 2008/0167394 A1* | 7/2008 | Haas ................. C08G 18/7621 521/164 |
| 2009/0088489 A1* | 4/2009 | Terheiden .......... C08G 18/1825 521/170 |

OTHER PUBLICATIONS

International Search Report & Written Opinion for related PCT Application PCT/US2017/053167, dated Dec. 11, 2017 (11 pgs).
International Preliminary Report on Patentability for related PCT Application PCT/US2017/053167, dated Apr. 11, 2019 (8 pgs).

* cited by examiner

*Primary Examiner* — John M Cooney
(74) *Attorney, Agent, or Firm* — Brooks, Cameron & Huebsch, PLLC

(57) ABSTRACT

A method of forming a flexible polyurethane foam that passes BS 5852:2006 source V (Crib 5) test. The method includes providing a modified polyisocyanate polyaddition (PIPA) 5 polyol formed by contacting a PIPA polyol dispersion with at least one carboxylic acid having a melting point above zero degree Celsius and present in a carrier solvent. The PIPA polyol dispersion has a polyol liquid phase content of 60 wt. % to 90 wt. % and a solid particle phase content of 10 wt. % to 40 wt. % based on a total weight of the PIPA polyol dispersion. From 10 weight percent (wt. %) to 80 wt. % of the modified PIPA polyol is combined with 90 wt. % to 20 10 wt. % of at least another polyether polyol based on a total weight of a polyol blend of the PIPA polyol and the at least another polyether polyol, where the polyether polyol is formed with propylene oxide and ethylene oxide and has an equivalent weight of 1,000 to 2,000 and a functionality of 3 to 6. The combination of the modified PIPA polyol and the polyether polyol are reacted with a polyisocyanate and a blowing agent to form the flexible polyurethane foam.

20 Claims, No Drawings

REDUCED FLAMMABILITY FLEXIBLE POLYURETHANE FOAM

This application is a National Stage Application under 35 U.S.C. § 371 of International Application Number PCT/US2017/053167, filed Sep. 25, 2017 and published as WO 2018/063959 on Apr. 5, 2018, which claims the benefit to U.S. Provisional Application 62/401,584, filed Sep. 29, 2016, the entire contents of which are incorporated herein by reference in its entirety.

TECHNICAL FIELD

The present disclosure relates to polyurethane foam and more particularly to flexible polyurethane foam having reduced flammability.

BACKGROUND

Polyurethane foams are generally prepared by the reaction of a polyisocyanate with a polyol, which is generally a hydroxyl functional polyoxyalkylene polyether polyol. By controlling the functionality of the polyisocyanate and the molecular weight and functionality of the polyol, polyurethane foams ranging from exceptionally soft, flexible foams to quite rigid foams may be prepared.

In order to increase the mechanical properties of polyurethane foams, it has become commonplace to utilize polyols containing dispersed solids. Common polyol dispersions are, for example, the so-called "graft polyols" which are stable dispersions of vinyl polymers, generally homopolymers or copolymers of acrylonitrile and styrene. Such polyols can increase the load bearing capacity of polyurethane foams, for example, when used as the sole polyol component or in admixture with conventional polyether polyols. Other polyols, for example polyester polyols may be added to these mixtures as well, as can also chain extenders such as short chain diols, diamines, or alkanolamines.

Polyol dispersions containing polyisocyanate polyaddition (PIPA) products as the dispersed phase are highly useful in preparing polyurethanes. These dispersions are prepared, for example, by reacting a polyisocyanate with an active hydrogen compound, generally in situ in a polyol. When the isocyanates are reacted with di- and trialkanolamines, the dispersions are termed PIPA polyols. Such polyisocyanate addition products may have shorter process cycles than graft polyols and be more economical to produce. The properties of foams prepared from such dispersions also have different physical properties and in general may require different formulations. In addition, there are specific advantages to such foams, such as low amounts of volatile organic compounds (VOCs), while foam processing is improved due to cell opening with the PIPA particles (e.g., when small) during foaming.

Reducing the flammability of flexible polyurethane foams made with PIPA polyols usually requires the use of flammability resistant (FR) additives such as halogenated and/or phosphorous based compounds. Those are not favored due to environmental, health and safety reasons and because they are acidic and over time could leach from the foam. Use of PIPA polyol and melamine, a nitrogen based compound, is a possible approach to improve flammability resistance. However the level of melamine needs to be high, which negatively impacts the foam properties. Accordingly, there is a need in the art to form flexible polyurethanes foam that have a reduced flammability without the use of FR additives such as halogenated and/or phosphorous based compounds.

SUMMARY

It has been surprisingly found that adding a carboxylic acid to a PIPA polyol in a polyisocyanate based foam formulation has a positive effect on foam flammability resistance (FR) and help reducing FR additive loading. The method of the present disclosure provides for forming a flexible polyurethane foam that passes BS 5852:2006 source V (Crib 5) test. The method includes providing a modified PIPA polyol formed by contacting a polyisocyanate polyaddition (PIPA) polyol dispersion with at least one carboxylic acid having a melting point above zero degree Celsius and present in a carrier solvent. The PIPA polyol dispersion has a polyol liquid phase content of 60 weight percent (wt. %) to 90 wt. % and a solid particle phase content of 10 wt. % to 40 wt. % based on a total weight of the PIPA polyol dispersion. From 10 wt. % to 80 wt. % of the modified PIPA polyol is combined with 90 wt. % to 20 wt. % of at least another polyether polyol based on a total weight of the polyol blend (PIPA polyol and the at least another polyether polyol), where the polyether polyol is formed with propylene oxide and ethylene oxide and has an equivalent weight of 1,000 to 2,000 and a functionality of 3 to 6. The combination of the modified PIPA polyol and the polyether polyol are reacted with a polyisocyanate and a blowing agent to form the flexible polyurethane foam. The polyols of the present disclosure are not metal corrosive.

DETAILED DESCRIPTION

It has been surprisingly found that adding a carboxylic acid to a PIPA polyol in a polyisocyanate based foam formulation has a positive effect on foam flammability resistance (FR) and help to reduce non-acidic FR additive loading. Without being bound by theory, it is thought that the carboxylic acid combines with the nitrogen present in the PIPA polyol and/or the amine catalyst so as to form a catalyst for isocyanate reactions leading to the presence of Biuret in the polymer structure. Using very potent trimerization catalyst, such as potassium salts of carboxylic acids, are known to improve foam flammability resistance. However, these strong catalysts damage foam aging properties, such compression sets, as shown in WO 9852988. The current use of carboxylic acid with PIPA polyol and no potassium does not detrimentally influence foam compression sets. It is also important to note that isocyanate index for the foam formulation being lower than 120 the isocyanate reaction is mostly leading to polyurethane and polyurea linkages.

The acid can be added to the PIPA polyol either after the manufacturing process, at any stage during storage, or as a component of the foam recipe. For each case foam FR performance can be improved. Preferably the acid is pre-blended with the PIPA polyol, where the PIPA polyol is fully reacted such that no free isocyanate groups are present. In other words, there are no free isocyanate groups present in the PIPA polyol used in the present disclosure.

The present disclosure provides for a method of forming a flexible polyurethane foam passing BS 5852:2006 source V (Crib 5) test. The method includes providing what is referred to herein as a modified polyisocyanate polyaddition (PIPA) polyol. Forming the modified PIPA polyol includes contacting a PIPA polyol dispersion with at least one carboxylic acid having a melting point above zero (0) degree Celsius and present in a carrier solvent. As discussed herein, the PIPA polyol dispersion has a polyol liquid phase content of 60 wt. % to 90 wt. % and a solid particle phase content of 10 wt. % to 40 wt. % based on a total weight of the PIPA polyol dispersion. The method further includes combining 10 weight percent (wt. %) to 80 wt. % of the modified PIPA polyol with 90 wt. % to 20 wt. % of at least another polyether polyol based on a total weight of the polyol blend, where the polyol blend is defined as the total weight of the PIPA polyol and the at least another polyether polyol. The polyether polyol is formed with propylene oxide and ethylene oxide and has an equivalent weight of 1,000 to 2,000 and a functionality of 3 to 6. The combination of the modified PIPA polyol and the polyether polyol are then reacted with a polyisocyanate and a blowing agent to form the flexible polyurethane foam. The flexible polyurethane foam does not include a halogenated based additive. In addition, the flexible polyurethane foam does not include a phosphorous based additive. Each of these component and steps will be discussed more fully herein.

The PIPA polyol dispersion is produced by reacting at least an olamine with a polyisocyanate in a polyol liquid phase. Specifically, the PIPA polyol dispersion is formed by a reaction product of a low equivalent weight polyol or, preferably, an olamine having a number average hydroxyl equivalent weight of less than 80 g/mol with a polyisocyanate having a number isocyanate equivalent weight that is less than 225, (to form a polyurethane or polyurethane-urea bonds) dispersed in a polyol liquid phase having a number average hydroxyl equivalent weight of at least 200 and at most 2,000 with at least 20% primary hydroxyl groups based on a total amount of hydroxyl groups in the polyol liquid phase. Examples of such reactions are provided in EP 2,707,410; U.S. Pat. No. 8,399,696; EP 3,044,247, in U.S. Provisional Application No. 61/877,287 (filed on Sep. 13, 2013) and in U.S. Provisional Application No. 61/877,290 (filed on Sep. 13, 2013).

The polyol liquid phase may be a polyoxypropylene polyol or a polyoxypropylene-polyoxyethylene polyol having at least 5 wt. % ethylene oxide (EO), preferably being EO capped. The PIPA polyol dispersion has at least 50% primary hydroxyl groups, based on a total amount (e.g., by number or weight) of hydroxyl groups. The reaction may be performed in situ, while the polyol and polyisocyanate reactants are dispersed or dissolved in the polyol liquid phase. The polyol liquid phase for forming the PIPA polyol can include at least one liquid polyether having a hydroxyl equivalent weight of at least 200 g/mole equivalence (e.g., from 200 to 1500, from 250 to 2000, from 400 to 1500, from 800 to 1350, etc.). The hydroxyl groups of the polyol liquid phase are primary hydroxyls and include secondary hydroxyls. At least 20%, at least 30%, at least 70% of the total amount of hydroxyl groups in the polyol liquid phase are primary hydroxyls. Conversely, the polyol liquid phase may contain no more than 20%, no more than 15%, no more than 10% of secondary hydroxyls based on the total amount of hydroxyl groups in the polyol liquid phase. For example, the polyol liquid phase may be a polyoxypropylene-polyoxyethylene polyol having an ethylene oxide content of 15% (e.g., less than 20 wt %, preferably EO capped). The polyol liquid phase may have a nominal hydroxyl functionality of at least 2.0 (e.g., may be a diol or a triol). For example, the nominal hydroxyl functional is at least 2.5, at least 3.0, from 2.5 to 6.0, and/or from 2.5 to 4.2. The number average hydroxyl equivalent weight of the polyol liquid phase may be from 205 g/mole equivalents to 6000 g/mole equivalents (e.g., 300 to 3000, 500 to 2000, 600 to 1350, 700 to 1200, 900 to 1100, etc.). If the polyol liquid phase is a mixture of two or more separately made polyol liquids, the polyol liquid phase independently have an average hydroxyl equivalent weight from 200 to 6000.

The selection of a catalyst for forming the polyol liquid phase may have an effect on the percentage of primary hydroxyl groups present in the resultant polyol liquid phase, depending if it is KOH or DMC catalyst. KOH is the preferred catalyst. According to one embodiment, the polyol liquid phase is triol that is a polyoxypropylene oxyethylene polymer having a hydroxyl equivalent weight of 900 to 2,000 and having 50% to 85% of primary hydroxyl groups. The hydroxyl groups in both the low equivalent weight polyol and the polyol liquid phase are reactive with isocyanate groups in the polyisocyanate. The reaction between the polyol liquid phase and the polyisocyanate may result in grafting that stabilizes the PIPA polyols. However, an excessive amount or grafting could result in a highly viscous product that contains little or no dispersed polymer phase. Accordingly, when forming the PIPA polyol dispersion, the reaction that forms the polyurethane or polyurethane-urea bonds should be balanced with the grafting reaction, e.g., by selecting a low equivalent weight polyol that is more reactive toward isocyanate groups than the polyol liquid phase while still providing a sufficient amount of grafting to form a stable PIPA polyol dispersion and optionally through the selection of the proper catalyst and of its level in the reactants and/or a stabilizer for the PIPA particles. The PIPA polyol dispersion may be produced without using any seed PIPA dispersions (e.g., use of a seed PIPA dispersion that has mainly primary hydroxyl groups to make a second PIPA dispersion with reduced primary hydroxyl group content may be excluded).

The PIPA polyol dispersion has a solids content from 10 wt % to 40 wt % (e.g., 10 wt % to 40 wt %, 15 wt % to 40 wt %, 20 wt % to 40 wt %, 25 wt % to 40 wt %, 15 wt % to 30 wt %, 15 wt % to 25 wt %, etc.), based on the total weight of the PIPA polyol dispersion. Solids content refers to the weight of the PIPA particles as a percentage of the total weight of the dispersion. The weight of the PIPA particles may be a calculated weight determined according to methods known in the art. The PIPA polyol dispersion has a polyol liquid phase content of 60 wt. % to 90 wt. % (e.g., 60 wt % to 90 wt %, 60 wt % to 85 wt %, 60 wt % to 80 wt %, 60 wt % to 75 wt %, 70 wt % to 85 wt %, 75 wt % to 85 wt %, etc.), based on the total weight of the PIPA polyol dispersion. The combination of the polyol liquid phase content and the solid particle phase content total 100 wt. % of the PIPA polyol dispersion.

For the various embodiments, the polyol liquid phase is a polyol formed with propylene oxide and ethylene oxide (EO) and has a functionality of 3 and an EO content of 5 wt. % to 30 wt. % based on the total weight of the polyol, wherein the polyol is capped with EO. The polyol liquid phase content refers to the weight of the polyols present in the PIPA polyol dispersion. The dispersed PIPA particles may have a particle diameter in the range of 0.05 µm to 20 µm. For example, at least 90% by weight of solid particles in the solid particle phase have a particle diameter of less than 5 micrometers (µm) (e.g., 0.05 µm to 5 µm, etc.).

In terms of weight, the low equivalent weight polyol may be used in an amount from 1 part to 50 parts (e.g., 2 parts to 30 parts, 3 parts to 15 parts, 3 parts to 10 parts, 3 parts to 7 parts, etc.) by weight per 100 parts by weight of the polyol liquid phase. Exemplary low equivalent weight polyols include ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, and sucrose. Exemplary olamines include diethanolamine, triethanolamine, triisopropanolamine, and diisopropanolamine. For example, triethanolamine may be used by itself or as a mixture with one or more of the foregoing (such a blend including 75 wt % to 99.9 wt % of triethanolamine and 0.01 wt % to 25 wt % of another low molecular weight polyol having a number average hydroxyl equivalent weight of less than 80, based on a total weight of the blend). The at least one other polyol or amine may account for from 0 wt % to 25 wt % of the total weight of the polyol component.

Another option is to combine the low molecular weight polyol with an amine such as a secondary or a primary amine to introduce polyureas (PHD) moieties in the PIPA particles. For example, a primary amine may be used. Examples include dicyclohexylamine (DCHA), cyclohexylamine (CHA), ethylene diamine (EDA), isophorone diamine (IPDA), trisaminopropylamine, Laromine™ from BASF, and Jeffamine™ polyetheramines from Huntsman. Since primary amines react faster than TEOA with the isocyanate, they may be considered as "in situ seeds" for the formation of fine PIPA particles.

The process for making the PIPA polyol dispersion may be performed in a batch-wise process, in a semi-batch process, or in a continuous process. The polyol liquid phase, the polyisocyanate, the low equivalent weight polyol, may be added in any order to the reaction mixture. For example, to form the PIPA polyol dispersion the reaction of the low equivalent weight polyol or olamine with the polyisocyanate may occur in the presence of the polyol liquid phase and a stabilizer, or a pre-reaction between the polyol liquid phase and the polyisocyanate may be performed and the low equivalent weight polyol may be added to the reactants thereafter.

The method of the present disclosure further includes forming the modified PIPA polyol by contacting the PIPA polyol dispersion with at least one carboxylic acid. As discussed above, the PIPA polyol is based on reaction of triethanolamine and polyisocyanate in situ. Hence PIPA particles contain tertiary nitrogen able to combine with carboxylic acid. The least one carboxylic acid contains an OH group and can be mono- and dicarboxylic acids having the carboxylic group attached to an alkyl or alkylene group having at least one carbon atom. For the various embodiments, the carboxylic acid has a melting point above zero degrees Celsius. Possible carboxylic acids include acetic acid, propionic acid, butyric acid, hexanoic acid, 2-ethylhexanoic acid, and the like. However these acids are not viable on industrial lines since they are metal corrosive and damage equipment. Additionally they are chain stoppers for the polymer build up being monofunctional. Preferred carboxylic acids are the ones bearing an OH group, such as, tartaric acid, lactic acid, benzoic acid, ricinoleic acid, or more preferably salicylic or glycolic acids. Formic acid even though it is bifunctional is not a preferred acid as it is corrosive to metal.

Carboxylic acids with an OH group have a melting point above zero (0) degree Celsius, hence have to be dissolved in a proper carrier solvent before being added to the PIPA polyol, either by itself or in combination with an amine, such as a tertiary amine catalyst. These mixtures are not metal corrosive.

In forming the modified PIPA polyol, the PIPA polyol dispersion, without free isocyanate, is contacted with at least one carboxylic acid in a carrier solvent. The carrier solvent for the at least one carboxylic acid can be methanol, ethanol, iso-propanol, glycerine, propylene glycol, dipropylene glycol, acetone, triethanolamine or water. Water is the preferred carrier solvent. The modified PIPA polyol can be formed at a temperature of 0° C. to 100° C. The amount of carboxylic acid will vary with the chemical nature of the PIPA polyol dispersed phase, the weight percent of the dispersed phase, and the time of addition to the polyol dispersion. Amounts of from 0.02 parts per hundred polyol (PHP) carboxylic acid to 1.5 PHP may be utilized, preferably from about 0.04 PHP to 1.0 PHP, all based on 100 parts polyol (PIPA polyol+ additional polyol). For the various embodiments, contacting the PIPA polyol dispersion with at least one carboxylic acid present in the carrier solvent includes adding the at least one carboxylic acid present in the carrier solvent to the PIPA polyol dispersion at a point in time selected from after a manufacturing process, during storage, or as a component of the foam recipe. Preferably, the PIPA polyol dispersion is contacted with the at least one carboxylic acid present in the carrier solvent at a point immediately following up to 24 hours after the preparation of the PIPA polyol dispersion provided no free isocyanate is present. Most preferably, the carboxylic acids and its solvent are added twenty-four (24) hours following preparation of the PIPA polyol dispersion.

The method further includes combining 10 wt. % to 80 wt. % of the modified PIPA polyol with 90 wt. % to 20 wt. % of a polyether polyol based on a total weight of the polyol blend, where the polyol blend is defined as the total weight of the PIPA polyol and the at least another polyether polyol. The polyether polyol can be derived from propylene oxide, ethylene oxide, and/or butylene oxide in the presence of an initiator compound or mixture of initiator compounds. For example, the polyether polyol is formed with propylene oxide and ethylene oxide and has an equivalent weight of 1,000 to 2,000 and a functionality of 3 to 6. The initiator may include at least two oxyalkylatable hydrogen atoms. Hydroxyl groups, primary amine groups, secondary amine groups, and thiol groups are examples of groups that contain oxyalkylatable hydrogen atoms. Exemplary initiators are glycerin, water, glycerol, ethylene glycol, propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, and propane diamine. Mixtures of two or more of the foregoing initiators may be used. For example, the initiator may be glycerin and/or sorbitol.

The polyisocyanate component includes at least one polyisocyanate compound. The polyisocyanate compound is an aromatic, a cycloaliphatic, or an aliphatic polyisocyanate. Exemplary polyisocyanate compounds include m-phenylene diisocyanate (MDI), toluene diisocyanate (TDI), hexamethylene diisocyanate (HDI), tetramethylene diisocyanate, cyclohexan diisocyanate, hexahydrotoluene diisocyanate, naphthylene diisocyanate, and bis(isocyanatomethyl)cyclohexane. In one embodiment, the polyisocyanate is an aromatic polyisocyanate. According to exemplary embodiments, the polyisocyanate component includes TDI or MDI, e.g., available from The Dow Chemical Company under the tradenames VORANATE and ISONATE. For example, the polyisocyanate component may include a mixture of different isomers of TDI or MDI, such as a mixture including from 60% to 85% of the 2,4'-isomer of TDI and 15% to 40% of the 2,6'-isomer of TDI. For example, the aromatic polyisocyanate has at least two isocyanate groups and includes 80% TDI 80 and 20% MDI. Preferably the polyisocyanate is TDI 80/20. The aromatic polyisocyanate can be used in the foam recipe at an isocyanate index of 70 to 120.

For the various embodiments, the blowing agents can include water, methylene chloride, carbon dioxide, low-boiling chlorofluorocarbons, fluorocarbons, and hydrocarbons. For example, water may be used in an amount from 1.0 parts to 6.0 parts (e.g., 1.5 parts to 6.0 parts, 2.5 parts to 6.0 parts, 2.5 parts to 5.0 parts etc.) by weight per 100 parts by weight of the foam forming polyol components. A methylene chloride based blowing agent may be used in an amount from 3 parts to 30 parts (e.g., 5 parts to 15 parts, 5 parts to 10 parts, etc.) by weight per 100 parts by weight of the foam forming polyol components.

Foam forming additive components may also be used in the method of the present disclosure. For example, foam forming additive components can include at least one optional foam-stabilizing surfactant, e.g., that helps stabilize the gas bubbles formed by the blowing agent during the foaming process. For example, the foam-stabilizing surfactant may be a silicone surfactant that is known in the art (such as an organosilicone surfactant), where reacting the combination of the modified PIPA polyol and the polyether polyol with the polyisocyanate and the blowing agent can includes 0.02 PHP to 2 PHP of the silicone based surfactant and where no dibutyltin dilaurate (DBTDL) is present.

The foam forming additive component may further include a crosslinker, a chain extender, a cell opener, a filler (such as melamine and/or calcium carbonate), a pigment, a colorant, a reinforcing agent, a biocide, a preservative, and/or an antioxidant. In one embodiment, a preferred cell opener can be provided by reacting the combination of the modified PIPA polyol and the polyether polyol with the polyisocyanate and the blowing agent with 1 wt. % to 5 wt. % of a high ethylene oxide (EO) polyol formed with at least 50 wt. % of EO, where the wt. % is based on the total weight of the combination to form the flexible polyurethane foam. A preferred crosslinker can be based on an alkanolamine, in an amount of 0.05 to 5 parts per hundred parts polyol. Optionally, urea can be included as one of the foam forming additive components.

In one embodiment, the flexible polyurethane foam can includes 5 parts per hundred polyol (PHP) to 40 PHP of melamine as the only fire resistant agent. The flexible polyurethane foams of the present disclosure do not contain or use in any way acidic halogen and/or phosphorous based FR additives.

The components for forming the flexible polyurethane foam can also include at least one tertiary amine based catalyst. Exemplary amine based catalysts include Triethylenediamine (TEDA, CAS #280-57-9) or bis dimethylaminoethyl ether (Niax A 1, CAS #3033-62-3). Other exemplary catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane and dimethylalkylamines where the alkyl group contains from 4 to 18 carbon atoms. Additional exemplary catalysts include tin-free catalysts such zinc or bismuth salts, for instance zinc ricinoleate (Kosmos 54, available from Evonik). The catalyst component used in the foaming reaction may also include at least one catalyst that is tin based. For example, the catalyst maybe stannous octoate.

The amount of the catalyst used may be from 0.05 parts per hundred polyol (PHP) to 2 PHP. For example, reacting the combination of the modified PIPA polyol and the polyether polyol with the polyisocyanate and the blowing agent can include 0.02 PHP to 2 PHP of the metal based catalyst selected from stannous octoate, zinc ricinoleate or a combination thereof, and where no dibutyltin dilaurate (DBTDL) is present. In an additional embodiment, reacting the combination of the modified PIPA polyol and the polyether polyol with the polyisocyanate and the blowing agent can further include using a second PIPA polyol, at least one tertiary amine based catalyst and a carboxylic acid bearing an OH group with water as the carrier solvent.

The flexible polyurethane foam is formed by reacting the combination of the modified PIPA polyol and the polyether polyol with the polyisocyanate and the blowing agent. As mentioned herein, the flexible polyurethane foam does not include a halogenated based additive. In addition, the flexible polyurethane foam does not include a phosphorous based additive. The flexible polyurethane foam of the present disclosure also has a density of 25 kg/m3 to 60 kg/m3 and is produced either continuously, discontinuously, in a mold or in free rise slabstock. Other processes can include Variable Pressure Foaming (VPF), as is known in the art.

In addition, embodiments of the flexible polyurethane foam of the present disclosure are capable of passing the BS 5852:2006 source V (Crib 5) test. Standards for flammability tests for polyurethane foams have been established because polyurethane foam may ignite when exposed to a sufficient heat source. For example, the British Standard Crib 5 flammability test (BS 5852—ignition source 5) uses a wooden assembly (referred to as a crib) as a source of ignition and may be used to determine the ignitability of upholstered furniture composites and/or complete pieces of furniture by arranging an assembly of upholstered composites to represent typical chairs. To meet the requirements of the Crib 5 flammability test, the sample when exposed to a flame under the test conditions, must self-extinguish in less than 10 minutes with a weight loss of less than 60 g (including the wooden crib), and a width of foam damage must be less than 10 cm on either side of the wooden crib without burning through the sample. According to exemplary embodiments, the process enables the formation of flexible polyurethane foams that pass the Crib 5 flammability test.

As mentioned, the flexible polyurethane foam can be formed either continuously, discontinuously, in a mold or in free rise slabstock by reacting the combination of the modified PIPA polyol and the polyether polyol with the polyisocyanate and the blowing agent. The reaction forming the flexible polyurethane foam may be performed at a temperature of, e.g., 0° C. to 100° C. (e.g., 10° C. to 70° C., 20° C. to 60° C., etc.). An elevated temperature may be desirable to reduce reaction time, but is often not necessary. The mixture is then allowed to react. Cooling can be applied if necessary to prevent excessive temperature increases due to the exothermic heat of reaction. The resulting flexible polyurethane foam can have a resiliency above 30% a 75% Compression Set below 20%. These properties can be achieved in a flexible polyurethane foam that does not include dibutyltin dilaurate.

Examples

All parts and percentages are by weight unless otherwise indicated. The terms combustion-modified, flame resistant, and similar terms as used herein refer to a material's performance in laboratory flammability tests, and are not meant to describe performance under actual fire conditions.

The following materials are principally used:

Voranol™ 6150 is a 6000 Mw ethylene oxide (EO) capped tri-functional polyol for the production of high resiliency (HR) foams (available from The Dow Chemical Company).

Voralux™ HF 505 is a high Mw EO capped six-functional polyol for production of HR foams (available from The Dow Chemical Company).

Voranol™ CP 1421 is a cell opener having a high EO content and containing tri-functional polyol (available from The Dow Chemical Company).

High Resiliency (HR) PIPA 20% is a PIPA polyol is based on reaction of triethanolamine and TDI 80/20 polyisocyanate in situ in HR carrier polyol.

Niax™ A-300 is an acid blocked amine containing 30% water (available from Momentive).

Dabco™ 8154 is an acid blocked amine (available from Air Products).

Niax™ A-1 is an amine catalyst (available from Momentive).

Ortegol™ 204 is a crosslinker containing 25% water (available from Evonik).

Kosmos™ 54 is a zinc catalyst (available from Evonik).

Tegostab™ B8783LF2 is a silicone surfactant (available from Evonik).

Stannous Octoate (SO), a tin catalyst (available from Sigma-Aldrich).

Melamine, a solid non-halogenated flame retardant (available from Sigma-Aldrich).

Toluene diisocyanate (TDI 80/20) (Voranate T-80 available from The Dow Chemical Company).

Salicylic acid, a carboxylic acid with OH group, melting point 160° C. (available from Sigma-Aldrich)

Glycolic acid, a carboxylic acid with OH group, melting point 78° C. (available from Sigma-Aldrich)

The HR PIPA 20% used herein has a solids content of 20 wt. % in a carrier polyol and a number average molecular weight of approximately 6000 g/mol. The carrier polyol is made by polymerizing alkylene oxides with a potassium hydroxide polymerization catalyst. It contains more than 70 wt. % of primary hydroxyl groups. The HR PIPA 20% is made by reacting triethanolamine with toluene diisocyanate in the presence of the carrier polyol, a zinc carboxylate urethane catalyst. No tin catalyst is present. The viscosity of the HR PIPA 20% is about 2.500 mPa*s (20° C.) and 90% of particles, by volume, are smaller than 5 μm.

The Examples 1 to 6 and Comparative Examples A through D are prepared using laboratory bench procedures according to the formulations in Tables 1 through 3, below. The components for the formulations in Tables 1 through 3 are accurately weighed in containers of suitable capacity, and the isocyanate is weighted separately. All components are maintained at room temperature (approximately 20° C.) during weighing and processing. A bench static mixer is used to prepare the samples. FOAMAT measurement device records key foam-processing characteristics such as foam rise-height, reaction temperature, and rise pressure. The standard 30 cm×30 cm×25 cm boxes were used. Specifically, the foams were produced according to a standardized hand-mix procedure done in three stages. In the first stage all ingredients with the exception of toluene diisocyanate (TDI) and SO tin catalyst were stirred with a propeller mixer for 30 seconds (s) at 2500 rotations per minute. In the second stage, the SO tin catalyst was added and stirring was continued for an additional 10 s. In a third stage the TDI was added to form a reaction mixture (formation of the reaction forming mixture is regarded as the time when the reaction starts, i.e., time=0 s) and stirred for an additional 10 s. The reaction mixture is then poured into the box and allowed to rise to form foam samples. Rise time and settling were measured. After finishing the foam processing, prepared foam were post cured in the oven with warm air circulation at 413 Kelvin for 5 minutes. Eventually, the foams were crushed and data related to their tightness was recorded.

Thereafter the testing of the foam samples includes measuring properties of the resultant foam samples, as discussed below. The Crib 5 flammability test (BS 5852:2006 source V), uses a wooden assembly as a source of ignition and is used to determine the ignitability of the Examples. When performing the test, the pass/fail criteria are: (i) no more than 60 grams of weight loss per specimen, (ii) self-extinguishing within 10 minutes from the ignition of the specimen (iii) flame cannot penetrate the full thickness of the sample, and (iv) no more than 10 cm of damage on either side of the ignition source (measured as no more than 25 cm of damage in a width-wise direction in which the crib structure having a width of 5 cm is presumed as the center, since there is a tendency for the crib structure to collapse when preforming the test). For the Crib 5 flammability test, the wooden crib is prepared using 18 wooden sticks of 40 mm×6.5 mm×6.5 mm with a total mass of 17 grams and to start the test 1.4 ml of Propan-2-ol is added to the lint.

The foam samples produced for the above working examples and comparative examples have physical property values seen below in Tables 1 through 3. The foam properties seen in Tables 1 through 3 were measured by the ISO or ASTM standards listed therein. The foam samples produced for the above working examples and comparative examples have resiliency values greater than 50% and dry Compression Sets below 20%.

The data in Tables 1 through 3 illustrates the unexpected results that using a carboxylic acid together with PIPA polyol has a positive effect on foam fire performance in the Crib 5 flammability test.

TABLE 1

In the following examples the acid was added directly to the PIPA polyol.

| COMPONENTS | Comparative Example (CE) A | Example (Ex) 1 (Invention) |
|---|---|---|
| VORALUX HF 505 | 34 | 34 |
| VORANOL CP 1421 | 1 | 1 |
| HR PIPA 20% | 65 | 65 |
| Melamine | 8 | 8 |
| Glycolic acid ** |  | 0.104*** |
| NIAX A-1 | 0.06 | 0.06 |
| DABCO 33LV | 0.12 | 0.12 |
| DEOA (85%) | 0.5 | 0.5 |
| Ortegol 204 | 0.5 | 0.5 |
| Kosmos 54 | 0.2 | 0.2 |
| Tegostab B8783 LF2 | 0.3 | 0.3 |
| SO | 0.07 | 0.07 |
| Total Water | 2.95 | 2.92 |
| TDI index | 100 | 100 |
| Density [kg/m3] ISO845-88 | 33.1 | 31.3 |
| CFD 40% [kPa] ISO3386-1 | 4.4 | 4.0 |
| Resilience [%] ASTM-D3574-11 | 51 | 51 |
| Air flow crushed [dm3/s] ISO7231 | 2.4 | 2.2 |
| Compression set 75% [%] ISO1856 | 12 | 12 |
| Compression set 90% [%] ISO1856 | 14 | 11 |
| FLAMMABILITY RESULTS |  |  |
| Crib 5, Weight Loss [g] BS 5852 | >72 | 47 |
| Crib 5, Self-extinguish BS 5852 | NO | YES |
| Crib 5, Time to Extinguish [s] BS 5852 | >360 | 182 |
| Crib 5 [Pass/Fail] BS 5852 | FAIL | PASS |

These data show that addition of glycolic acid allows the inventive foam to pass the BS 5852:2006 source V (Crib 5) test with a very low level of melamine. There was no difference in foam airflow.

TABLE 2

The following data show the effects of adding the acid either directly before foaming or 24 hours before foaming. In both cases this allows to pass the BS 5852:2006 source V (Crib 5) test with minimal effect on foam compression sets and similar foam airflows.

| COMPONENTS | CE B | Ex 2 | Ex 3 | Ex 4 |
|---|---|---|---|---|
| VORANOL 6150 | 59 | 59 | 59 | 59 |
| VORANOL CP 1421 | 1 | 1 | 1 | 1 |
| HR PIPA 20% | 40 | 40 | 40 | 40 |
| Melamine | 30 | 30 | 28 | 28 |
| Salicylic acid * | | 0.117 | | |
| Glycolic acid ** | | | 0.064*** | 0.064 |
| NIAX A-1 | 0.04 | 0.04 | 0.04 | 0.04 |
| DABCO 33LV | 0.12 | 0.12 | 0.12 | 0.12 |
| DEOA (85%) | 2.4 | 2.4 | 2.4 | 2.4 |
| Tegostab B8783 LF2 | 0.2 | 0.2 | 0.2 | 0.2 |
| SO | 0.08 | 0.08 | 0.08 | 0.08 |
| Total Water | 3.59 | 3.59 | 3.61 | 3.61 |
| TDI index | 85 | 85 | 95 | 95 |
| Density [kg/m3] ISO845-88 | 34.5 | 33.9 | 32.7 | 32.2 |
| CFD 40% [kPa] ISO3386-1 | 2.7 | 2.6 | 3.5 | 3.3 |
| Resilience [%] ASTM-D3574-11 | 58 | 60 | 55 | 57 |
| Air flow crushed [dm3/s] ISO7231 | 2.1 | 2.9 | 3.1 | 3.3 |
| Compression set 75% [%] ISO1856 | 7.8 | 7.9 | 9.1 | 8.9 |
| Compression set 90% [%] ISO1856 | 15.7 | 17.5 | 14.1 | 11.9 |
| FLAMMABILITY RESULTS | | | | |
| Crib 5, Weight Loss [g] BS 5852 | 67 | 38 | 30 | 31 |
| Crib 5, Self-extinguish BS 5852 | YES | YES | YES | YES |
| Crib 5, Time to Extinguish [s] BS 5852 | 308 | 492 | 182 | 260 |
| Crib 5 [Pass/Fail] BS 5852 | FAIL | PASS | PASS | PASS |

* 30% ethanol solution
** 30% water solution
***premixed with PIPA polyol for 24 hours before foaming

TABLE 3

| COMPONENTS | CE C | Ex 5 | Ex 6 | Ex 6 | CE D |
|---|---|---|---|---|---|
| VORANOL 6150 | 59 | 59 | 59 | 59 | 59 |
| VORANOL CP 1421 | 1 | 1 | 1 | 1 | 1 |
| HR PIPA 20% | 40 | 40 | 40 | 40 | 40 |
| Melamine | 30 | 28 | 28 | 28 | 28 |
| Niax A-300 | | 0.12*** | 0.12 | | |
| Dabco 8154 | | | | | 0.12 |
| NIAX A-1 | 0.04 | 0.04 | 0.04 | 0.04 | 0.04 |
| DABCO 33LV | 0.12 | | | | 0.12 |
| DEOA (85%) | 2.4 | 2.4 | 2.4 | 2.4 | 2.4 |
| Tegostab B8783 LF2 | 0.2 | 0.2 | 0.2 | 0.2 | 0.2 |
| SO | 0.08 | 0.08 | 0.08 | 0.08 | 0.08 |
| Total Water | 3.61 | 3.61 | 3.61 | 3.57 | 3.61 |
| TDI index | 85 | 95 | 95 | 95 | 95 |
| Density [kg/m3] ISO845-88 | 34.5 | 32.7 | 32.0 | 32.4 | 31.9 |
| Compression Force Deflection (CFD) 40% [kPa] ISO3386-1 | 2.7 | 3.3 | 3.1 | 2.9 | 3.0 |
| Resilience [%] ASTM-D3574-11 | 58 | 57 | 58 | 59 | 59 |
| Air flow crushed [dm3/s] ISO7231 | 2.1 | 3.2 | 3.0 | 3.1 | 3.0 |
| Compression set 75% [%] ISO1856 | 7.8 | 7.9 | 8.2 | 7.6 | 8 |
| Compression set 90% [%] ISO1856 | 15.7 | 15.0 | 12.9 | 14.3 | 12.0 |
| FLAMMABILITY RESULTS - Crib 5 Results Below | | | | | |
| Crib 5, Weight Loss [g] BS 5852 | 67 | 28 | 32 | 30 | 79 |
| Crib 5, Self-extinguish BS 5852 | YES | YES | YES | YES | YES |
| Crib 5, Time to Extinguish [s] BS 5852 | 308 | 206 | 206 | 193 | 240 |
| Crib 5 [Pass/Fail] BS 5852 | FAIL | PASS | PASS | PASS | FAIL |

* 30% ethanol solution
** 30% water solution
***premixed with polyol for 24 hours It is known that Dabco 8154 (formic acid blocked amine) is corrosive to metal. Therefore formic acid is not a preferred acid. These data show that comparative foam (without acid) fails the BS 5852:2006 source V (Crib 5) test having more than 60 g weight loss, while the foams of the present disclosure with acid pass the BS 5852:2006 source V (Crib 5) test with shorter extinguishing times and a reduced level of melamine.

What is claimed is:

1. A method of forming a flexible polyurethane foam passing BS 5852:2006 source V (Crib 5) test, comprising:
   providing a modified polyisocyanate polyaddition (PIPA) polyol formed by contacting a PIPA polyol dispersion with at least one carboxylic acid having a melting point above zero degree Celsius and present in a carrier solvent, wherein the PIPA polyol dispersion has a polyol liquid phase content of 60 wt. % to 90 wt. % and a solid particle phase content of 10 wt. % to 40 wt. % based on a total weight of the PIPA polyol dispersion, wherein the least one carboxylic acid contains a carboxyl group and an OH group;
   combining 10 weight percent (wt. %) to 80 wt. % of the modified PIPA polyol with 90 wt. % to 20 wt. % of at least another polyether polyol based on a total weight of a polyol blend of the PIPA polyol and the at least another polyether polyol, wherein the polyether polyol is formed with propylene oxide and ethylene oxide and has an equivalent weight of 1,000 to 2,000 and a functionality of 3 to 6; and
   reacting the combination of the modified PIPA polyol and the polyether polyol with a polyisocyanate and a blowing agent to form the flexible polyurethane foam.

2. The method of claim 1, wherein the PIPA polyol dispersion is produced by reacting an olamine with a polyisocyanate in a polyol.

3. The polyurethane foam of claim 1, wherein the flexible polyurethane foam does not include a halogenated based additive.

4. The polyurethane foam of claim 1, wherein the flexible polyurethane foam does not include a phosphorous based additive.

5. The method of claim 1, wherein the polyol liquid phase is a polyol formed with propylene oxide and ethylene oxide (EO) and has a functionality of 3 to 6 and an EO content of 10 wt. % to 30 wt. % based on the total weight of the polyol, wherein the polyol is capped with EO.

6. The method of claim 1, wherein the combination of the polyol liquid phase content and the solid particle phase content total 100 wt. % of the PIPA polyol dispersion.

7. The method of claim 1, wherein at least 90% by weight of solid particles in the solid particle phase have a particle diameter of less than 5 micrometers (μm).

8. The method of claim 1, wherein reacting the combination of the modified PIPA polyol and the polyether polyol with the polyisocyanate and the blowing agent further includes 1 wt. % to 5 wt. % of a high ethylene oxide (EO) polyol formed with at least 50 wt. % of EO, wherein the wt. % is based on the total weight of the combination to form the flexible polyurethane foam.

9. The method of claim 1, wherein the polyisocyanate is an aromatic polyisocyanate.

10. The method of claim 9, wherein the aromatic polyisocyanate has at least two isocyanate groups and is toluene diisocyanate (TDI) 80/20.

11. The method of claim 9, wherein the aromatic polyisocyanate used in forming the flexible polyurethane foam has an isocyanate index of 70 to 120.

12. The method of claim 1, further including a crosslinker, based on an alkanolamine, in an amount of 0.05 to 5 parts per hundred parts polyol, and optionally urea.

13. The method of claim 1, further including at least one tertiary amine based catalyst at a level of 0.05 parts per hundred parts polyol (PHP) to 2 PHP.

14. The method of claim 1, wherein reacting the combination of the modified PIPA polyol and the polyether polyol with the polyisocyanate and the blowing agent further includes a second PIPA polyol, at least one tertiary amine based catalyst and the carboxylic acid bearing the OH group with water as the carrier solvent.

15. The method of claim 14, wherein the carboxylic acid bearing the OH group is present at a level of 0.02 PHP to 1.5 PHP.

16. The method of claim 1, wherein contacting the PIPA polyol dispersion with at least one carboxylic acid present in the carrier solvent includes adding the at least one carboxylic acid present in the carrier solvent to the PIPA polyol dispersion at a point in time selected from after a manufacturing process, during storage, or as a component of the foam recipe.

17. The method of claim 1, wherein reacting the combination of the modified PIPA polyol and the polyether polyol with the polyisocyanate and the blowing agent further includes 0.02 PHP to 2 PHP of a metal based catalyst selected from stannous octoate, zinc ricinoleate or a combination thereof and where no dibutyltin dilaurate (DBTDL) is present.

18. The method of claim 1, wherein reacting the combination of the modified PIPA polyol and the polyether polyol with the polyisocyanate and the blowing agent further includes 0.02 PHP to 2 PHP of a silicone based surfactant.

19. The method of claim 1, wherein the flexible polyurethane foam includes 5 PHP to 40 PHP of melamine as the only fire resistant agent.

20. The method of claim 1, wherein reacting the combination of the PIPA polyol and the polyether polyol with the polyisocyanate and the blowing agent further includes glycolic acid, salicylic acid or ricinoleic acid.

* * * * *